W. PIGOTT.
FARE-REGISTER.
No. 184,661.    Patented Nov. 21, 1876.
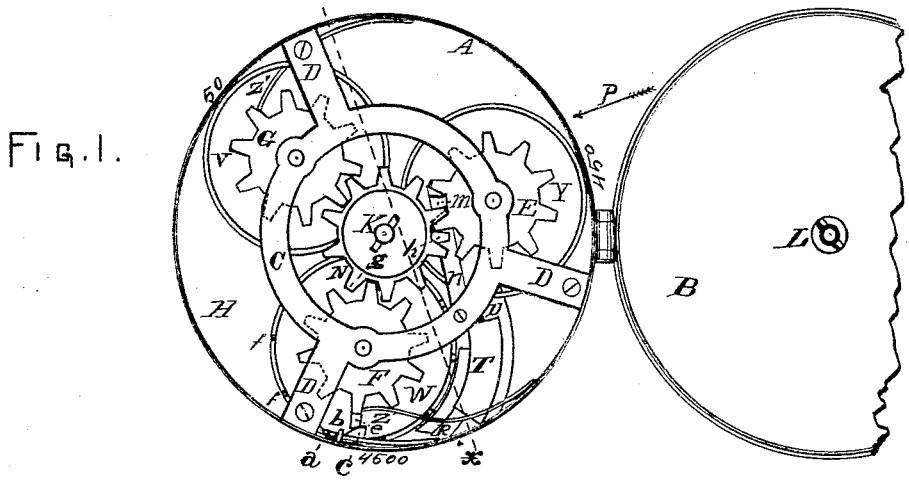
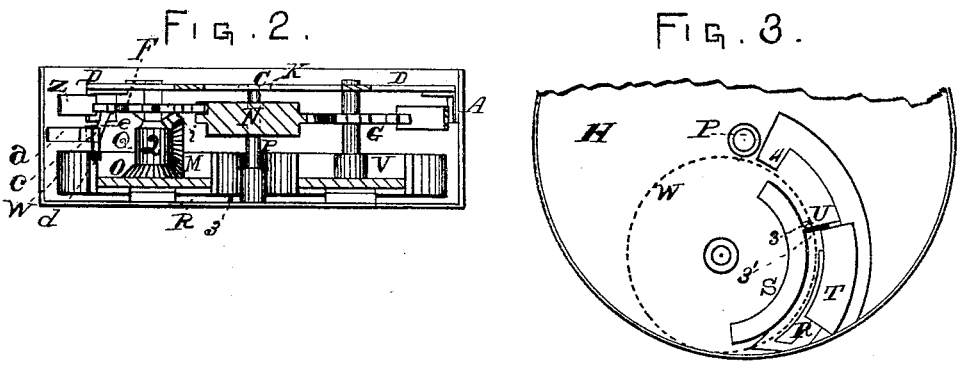
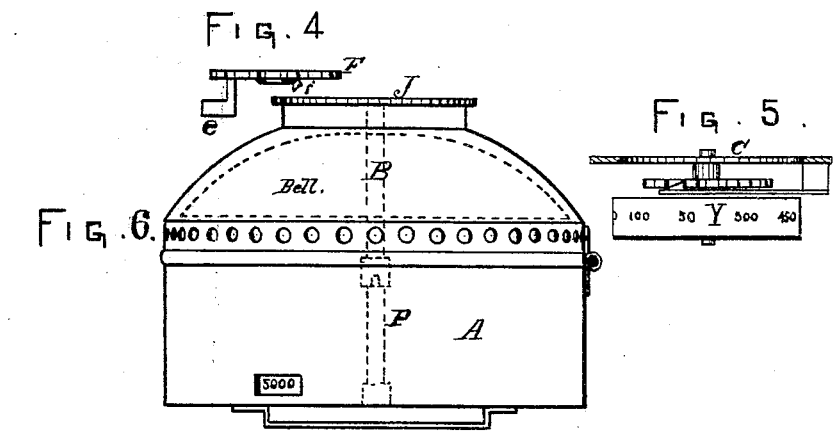
ATTEST:
O. H. Adix
Wm. Goggar
INVENTOR:
William Pigott
By G. L. Chapin,
Atty.

UNITED STATES PATENT OFFICE.

WILLIAM PIGOTT, OF CHICAGO, ILLINOIS, ASSIGNOR OF TWO-THIRDS HIS RIGHT TO DAVID COLE, OF SAME PLACE.

IMPROVEMENT IN FARE-REGISTERS.

Specification forming part of Letters Patent No. 184,661, dated November 21, 1876; application filed August 10, 1876.

*To all whom it may concern:*

Be it known that I, WILLIAM PIGOTT, of Chicago, in the county of Cook and State of Illinois, have invented a new and useful Improvement in Alarm Indicators and Registers, of which the following is a specification:

The nature of the present invention consists, in general terms, of a two-part case, in the body of which is placed a series of cog-wheels, operating drums, on which are marked the figures to indicate the number of times a bell has been rung. The drums operate in a suitable case, which is cut away to expose the figures.

The cover of the case is provided with a bell and knob for ringing it simultaneously with the moving of one or more of the drums, and the spindle of the bell-knob clutches into the shaft of the center cog-gear, so that the cover may be opened, and, when closing, connect the operating parts.

The invention proper consists in the novel manner of operating the drums, so as to continue registering from one drum to another.

In the drawings, Figure 1 is a top or plan view of the device with the cover open; Fig. 2, a vertical section of the case and gearing on line $x$, looking in the direction of dart $p$; Fig. 3, a plan of a part of the bottom of the case, showing the stop-slide. Fig. 4 shows one cog-gear removed, with its dogs. Fig. 5 shows a cog-gear and its connection with its drum. Fig. 6 shows the case in elevation, with the cover closed.

A represents a cylindrical case, which is made of metal, and of suitable size to support the mechanism hereinafter described. N represents a center ten-cog gear, whose shaft P turns in a bearing in the bottom H of the case A, and a bearing on the spindle L, projecting down from the cover B, the top K of the shaft P clutching into the spindle when the cover is being shut, so that when the knob J of the cover is turned the gear will be also turned.

The gear N is provided with an under cog, $h$, Fig. 1, which, at each revolution of the gear N, turns a ten-cog gear, E, by the following means: A spring, $n$, is attached to the under side of the bridge C, and extends under the cog-gear E, and on its end is a lug or catch, $m$, projecting up and locking in between the cogs of gear E, to hold it in a fixed position until the under cog $h$ comes in contact with it, and forces it down and unlocks the gear E, so that cog $h$ may turn one cog round, carrying the drum Y with it. The gear N meshes into gear G, which has also ten cogs, and rotates the same number of times as N, and carries the drum V with it.

There is an elevated cog, $g$, on the gear N, which at each revolution turns a gear, F, which lies its thickness above the gear N. This gear F does not communicate directly with the drum W; but to the shaft L of said gear is pivoted a bevel-wheel, M, Fig. 2, which is turned by a spur or dog, $i$, projecting down from the under side of gear F. (See Figs. 2 and 4.) This bevel-gear M meshes into a horizontal bevel-gear, O, attached to the drum W. The gear F is loose on the shaft 2, and rotates the same as gear N, and every ten revolutions of the gear F gives to the drum W one-tenth of a rotation by means of the spur $i$ and bevel-gear M O.

The means for locking the drum W consists of a spring, $a$, Figs. 1 and 2, which is provided with a catch, $d$, Fig. 2, locking into any one of the ten notches $f$, Fig. 1, in the top of the rim of the drum W. The means for releasing the catch of the spring from the notches $f$ consists of a dog or arm, $e$, on the under side of gear F, which strikes a projection, $c$, Figs. 1 and 2, and pushes the spring back toward the internal periphery of the case.

The drum V is divided into ten spaces, on which are marked, respectively, the figures 5, 10, 15, 20, 25, 30, 35, 40, 45, 50. The drum Y is divided into ten spaces, and marked, respectively, 50, 100, 150, 200, 250, 300, 350, 400, 450, 500, and the drum W is divided into the same number of spaces, and has marked on the spaces, respectively, 500, 1,000, 1,500, 2,000, 2,500, 3,000, 3,500, 4,000, 4,500, 5,000. Spring-dogs Z Z′, fastened to the case A, prevent the gear from turning in the wrong direction.

The means for locking the drum W, when 5,000 is registered, consists of a sliding plate, R, held to the bottom of the case by a cap-plate, T. This sliding plate is provided with a slot, which operates on a pin-stop to govern its longitudinal movement on the segment of a circle. An upwardly-projecting nib, U, on this plate engages a downwardly-projecting nib on the periphery of the bottom of the drum W, so that the latter cannot turn more than one and one-tenth of a revolution, which is the proper distance to properly expose the figures on its periphery. 3, Fig. 2, shows the nib on the drum W, and 3, Fig. 3, shows the same nib in position against the nib U on slide R.

To set the drum W, turn it to the left, which will bring the nib 3 to the opposite side 3' of the nib U, and continue to turn till the side R is carried against the shoulder or stop 4, Fig. 3. This will bring No. 4,500 on drum W to view through an opening in the case at that number, Fig. 1. Now place No. 450 on drum Y, so as to show through an opening in the case where that number is marked, and place No. 50 on drum V, so it will show through a hole in the case where that number is marked. To do this the center cog-gear is to be first removed, and after the adjustment above described is made it is to be replaced, so as to bring the cog h on the top of the lug or catch m, bearing it down. The cover is then to be closed, engaging the spindle L with the shaft P at K, and the device is then ready for use.

An ordinary bell in the cover is arranged to ring at each tenth movement of the gear N. The knob J is to be turned to the right. In practice, the cover is to be provided with a secure lock.

I do not claim multiplying numbers by a series of wheels or drums, or broadly registering by that means; but

I claim and desire to secure by Letters Patent—

1. The drum W, with bevel-gear M O, shaft 2, spring-catch a, sliding plate R, arm e, dog i, drums V Y, gear N G E F, spring-catch n m, shaft P, and spindle L, all combined as and for the purpose set forth.

2. The slide R, combined with the drum W, as set forth.

3. The two-part case A B, combined with the spindle L and shaft P, gearing N E F G, drums V W Y, as described and shown.

4. The removable center gear N, in combination with the gear G E F and registering-drums V Y W, as specified.

WILLIAM PIGOTT.

Witnesses:
G. L. CHAPIN,
O. H. ADIX.